United States Patent Office 2,948,967
Patented Aug. 16, 1960

2,948,967

PROCESS FOR TREATING ALKALI METAL CARBONATES

Clyde B. Myers, Painesville, Ohio, assignor to Diamond Alkali Company, Cleveland, Ohio, a corporation of Delaware No Drawing. Filed Mar. 2, 1959, Ser. No. 796,257

9 Claims. (Cl. 34—12)

This invention relates to a process for improving the flowability characteristics of alkali metal carbonates. It relates more particularly to an improved process for preparing alkali metal carbonates of improved flowability and storage characteristics by reducing the caking tendencies of the solid product.

This application is a continuation-in-part of my co-pending application Serial No. 598,244, filed July 17, 1956.

It is known that alkali metal carbonates have a tendency to "cake" or form cohesive masses during storage or transit. This caking tendency is not believed to be necessarily related to moisture "pick-up" since soft caking frequently occurs in sealed containers and especially with packing and age. Other factors, not fully understood, appear to contribute to the caking tendencies of the alkali metal carbonate product. The product, as a result of such tendency to cake or "set" consequently becomes lumpy and its flowability and storage characteristics are impaired. Thus, when alkali metal carbonates are stored or shipped for a considerable distance, the physical characteristics of the product and its composition tend to be altered, which occurrence is objectionable both from the standpoint of the consumer and the producer.

Although the flowability and storageability of alkali metal carbonates is generally affected by moisture and by other unknown factors as indicated above, the presence of substantial amounts of very small particle size alkali metal carbonates or "fines" apparently tends to reduce the flowability of a mass of the product. An example of this is commercial light soda ash which has particles not in excess of 12 mesh, with not more than 5% of particles in excess of 20 mesh and contains at least 15% of particles not exceeding 200 mesh. It is found that such a soda ash product has poor flowability characteristics and as a consequence is objectionable from the standpoint of handling the material. In the past, therefore, attempts have been made to produce a more flowable product by reducing the amount of the fine fraction in order to have an acceptable product. This, however, has not been completely successful, thus indicating that the fines alone are not responsible for the reduction in flowability.

Herefore the tendency of alkali metal carbonates to cake or set has also been countered to some extent by treating with additives, i.e., organic or inorganic materials, to reduce sticking or caking of the product. The use of such additives, however, can result in an expensive step requiring additional operations in its production, as well as affecting the quality thereof.

This invention provides a new method for improving the flowability characteristics and non-sticking tendency of alkali metal carbonates, which method is effective regardless of the amount of "fines" in the material. Briefly, the invention relates to a method of treating a substantially dry solid alkali metal carbonate to decrease the tendency to form cohesive masses which comprises the step of contacting a mass of said material with a gas comprising carbon dioxide. By the process of this invention, there is obtained a product of free-flowing solids and of substantially non-sticking characteristics.

Although the invention is applicable to the treatment of alkali metal carbonates, viz., lithium, potassium, sodium and the like, the process will be described with reference to sodium carbonate for the reason that it is commercially the most important of the alkali metal carbonates. The manufacture of sodium carbonate is well known in the art and for this reason it is not deemed necessary here to describe any procedure for its preparation.

In one aspect of this invention, sodium carbonate in substantially dry solid particle form is contacted with a gas comprising carbon dioxide to produce a product of sodium carbonate possessing free flowing characteristics and substantially non-caking tendencies.

In another aspect of this invention sodium carbonate in substantially dry solid particle form is stored in an atmosphere of a gas comprising carbon dioxide thereby to obtain a sodium carbonate product which is free flowing and is substantially non-caking. In either aspect of this invention, sufficient carbon dioxide gas is used to contact substantially the entire mass of sodium carbonate and thereby impart the desired characteristics of flowability and non-caking to the mass.

It should be noted that as used herein, the terms "commercial light ash" or "light ash of commerce" refers to a mass of sodium carbonate having particles of a size not in excess of 12 mesh, with no more than 5% exceeding 20 mesh and containing at least 15% of particles of a size not in excess of 200 mesh.

The temperature at which the sodium carbonate is contacted with the carbon dioxide and the contact time are not critical. As a consequence, ordinary atmospheric temperatures can be used in contacting the sodium carbonate although higher or lower temperatures are also applicable. The time required for contacting the gas and solid materials can vary although a few minutes is sufficient. At any rate, the contact time and temperatures employed should be adjusted to impart the desired properties to the materials. These conditions can be determined routinely by one skilled in the art.

It is not necessary for the purpose of this invention that carbon dioxide be in a substantially dry condition since it is found that a carbon dioxide gas containing up to about 5 percent moisture is effective. The percentage of moisture should not be much higher since the flowability will be adversely affected thereby. The amount of carbon dioxide by volume that is required for imparting the desired non-caking tendencies to the sodium carbonate can range from 35 percent or lower and up to 100 percent. When a 35 percent by volume or less carbon dioxide is used, the remainder of the gaseous components are inert gases which do not affect the product. It is preferred, however, to employ a substantially dry carbon dioxide gas in the process of this invention.

In contacting a mass of sodium carbonate with carbon dioxide, the gas can be introduced into any suitable container or storage bin via pipes or lines and the contact effected by agitation or by diffusion. It is only desirable that the entire product be contacted with the carbon dioxide gas. The pressure at which the gas is introduced is not critical, it being only neecssary that the mass of sodium carbonate be blanketed or contacted by the gas. Thus, atmospheric pressures can be used although lesser or greater pressures are applicable.

If the sodium carbonate is in storage, the process of this invention includes the step of keeping the products under an atmosphere of a gas comprising about 35 percent carbon dioxide, although as mentioned heretofore, lower percentages are applicable, as long as they impart the desired non-caking property to the product.

The effect of carbon dioxide on the particles of sodium carbonate, i.e., reducing the tendency to cake and poor flowability (angle of repose) is somewhat obscure and not completely understood. Whether the gas particles of carbon dioxide are held by chemisorption or by physical adsorption or both is not completely known and no explanation is hereby attempted. In order, however, that this invention may be more fully appreciated by those concerned, reference is made to the examples below.

In the examples below, the solid substantially dry sodium carbonate is added to a vessel containing a movable plate at the bottom. The sodium carbonate particles are not packed, that is, they fall to the bottom movable plate as a "fluffed" mass of particles. In the examples to follow about 500 grams of the material is added to the vessel. The plate contains a series of orifices or holes of varying diameter. The flow of the sodium carbonate is determined by moving the plate and tapping the apparatus until the smallest orifice is found through which the sodium carbonate will flow freely. Obviously, this method of determining the flowability of the material is not intended as a limitation of the invention since any other suitable apparatus or method can be employed in such determinations. The description of the apparatus given above is merely for the purpose of comparing the flowability of treated and untreated samples of sodium carbonate with carbon dioxide gas and for purposes of better understanding the effect of the gas on the caking and flowing characteristics of the treated material.

*Example I*

A sample of newly-manufactured commercial light soda ash analyzing about 58.1% $Na_2O$ content and having the following particle sizes:

| +80 | +100 | +120 | +140 | +170 | +200 | −200 |
|-----|------|------|------|------|------|------|
| 9.0% | 5.6% | 8.7% | 12.8% | 20.4% | 10.0% | 33.5% | is tested for flowability on an apparatus such as described above. It is found that the smallest diameter through which the sample will flow is a 1 inch hole upon tapping the apparatus. An identical sample is then subjected to treatment with carbon dioxide, i.e., by stirring the mass with a stream of dry carbon dioxide and then the sample is tested for flowability. It is found that the sample will flow freely through a ¼ inch hole on tapping the apparatus. An identical sample of soda ash treated with air instead of $CO_2$ is found to be substantially unaffected, that is, it will not flow through a smaller diameter hole, thereby proving that the effect is not simply one of fluidizing.

*Example II*

An untreated sample identical to that used in Example I, is found to flow through a minimum 1 inch hole on tapping the apparatus. An identical sample is then shaken in a dry carbon dioxide atmosphere and the sample tested for flowability. It is found that the sample will flow through a ¾ inch hole in the testing apparatus upon tapping it.

*Example III*

A sample of sodium carbonate analyzing 58.1 $Na_2O$ content and entirely composed of minus 200 mesh material is tested for flowability as in the procedure described above. It is found that the smallest diameter that the material will flow through is a 1¼ inch hole in the apparatus upon tapping it. An identical sample is then stirred with a dry carbon dioxide gas and tested for flowability. It is found that the material will flow freely through a ½ inch hole upon tapping the apparatus.

*Example IV*

A sample of fine sodium carbonate, predominantly of minus 325 mesh material, taken from the dust collector above a light soda ash dryer is tested for flowability and found not to flow even through a 2 inch hole in the apparatus. Upon treating two identical samples with moist and dry carbon dioxide it is found that both samples will flow through a 1¾ inch hole upon tapping the apparatus.

*Example V*

A sample of commercial light soda ash, having a particle size analysis as in Example I, is screened to remove all −200 mesh material. The −200 mesh materials and the +200 mesh materials are combined in various proportions to give four samples having the following compositions:

100% −200 mesh
15% −200 mesh
25% −200 mesh
35% −200 mesh

Each of the above samples is divided in half and one-half is treated with $CO_2$ for 15 minutes. Following the $CO_2$ treatment, the treated and untreated half of each sample is tested for flowability, using the apparatus and procedure as described above. The results obtained are as follows:

| Sample | Smallest Orifice through which Sample flows, inches | Relative Orifice areas, using ¼" Orifice as Unity |
|---|---|---|
| 100% −200 mesh untreated | 1¼ | 25 |
| 100% −200 mesh $CO_2$ treated | 1 | 16 |
| 15% −200 mesh untreated | ¾ | 9 |
| 15% −200 mesh $CO_2$ treated | ¼ | 1 |
| 25% −200 mesh untreated | ¾ | 9 |
| 25% −200 mesh $CO_2$ treated | ½ | 4 |
| 35% −200 mesh untreated | ¾ | 9 |
| 35% −200 mesh $CO_2$ treated | ½ | 4 |

From the above examples, it will be noted that treating sodium carbonate with carbon dioxide results in striking changes in the flowability of the product. In addition, the treated samples all show improved non-caking characteristics after 24 hours storage as compared to the untreated samples which show soft caking after this period of storage.

Similar tests on different samples show substantially the same improvements noted above. It should also be mentioned here that subjecting a carbon dioxide treated sample and an untreated sample to 26" of mercury vacuum does not alter the flow improvement characteristics of the treated sample. Moreover, the amount of carbon dioxide retained by the sodium carbonate does not result in any significant effect on the sodium oxide content of the material.

While there have been described certain preferred embodiments for carrying out the process of this invention, it should be understood that these are by way of example only, and it is intended to cover all aspects and modifications that fall within the spirit and scope of the appended claims.

What is claimed is:

1. A process for treating dry, solid alkali metal carbonate particles to decrease their tendency to form cohesive masses which comprises the step of contacting a mass of said particles of a particle size not in excess of 12 mesh, not more than 5% of said particles exceeding 20 mesh, with at least 15% of said particles of a particle size not in excess of 200 mesh, with a gas comprising carbon dioxide, not more than 5% of said gas being water vapor, the remaining constituents of which gas are chemically inert with respect to the alkali metal carbonate, said contact being at a temperature below that at which calcination of said alkali metal carbonate occurs.

2. A process for treating dry, solid alkali metal carbonate particles to decrease their tendency to form cohesive masses which comprises the step of contacting a mass of said particles of a particle size not in excess of 12 mesh, not more than 5% of said particles exceeding 20 mesh, with at least 15% of said particles having a particle size not in excess of 200 mesh, with a gas comprising at least about 35% by volume carbon dioxide, the remaining constituents of which gas are chemically inert with respect to the alkali metal carbonate, said contact being at a temperature below that at which calcination of said alkali metal carbonate occurs.

3. The process as claimed in claim 2 wherein the alkali metal carbonate is sodium carbonate.

4. The process according to claim 2 wherein the alkali metal carbonate particles are agitated with the gas comprising carbon dioxide.

5. The process as claimed in claim 2 wherein the alkali metal carbonate particles are stored in an atmosphere of the gas comprising carbon dioxide.

6. The process for treating dry sodium carbonate particles to improve their flowability and storage characteristics which consists of contacting a mass of said particles having a particle size not in excess of 12 mesh, not more than 5% of said particles exceeding 20 mesh, with at least 15% of said particles having a particle size not in excess of 200 mesh, with a gas comprising at least about 35% by volume carbon dioxide, the remaining constituents of which gas are chemically inert with respect to the sodium carbonate, said contact being at a temperature below that at which calcination of said sodium carbonate occurs.

7. The process as claimed in claim 6 wherein the sodium carbonate particles are agitated with the gas comprising carbon dioxide.

8. The process as claimed in claim 6 wherein the sodium carbonate particles are stored in an atmosphere of the gas comprising carbon dioxide.

9. The process as claimed in claim 6 wherein the carbon dioxide comprising gas with which the sodium carbonate particles are contacted is substantially dry.

References Cited in the file of this patent
UNITED STATES PATENTS

| | | |
|---|---|---|
| 1,222,079 | Damon | Apr. 10, 1917 |
| 2,037,809 | MacMullin | Apr. 21, 1936 |
| 2,055,084 | MacMullin | Sept. 22, 1936 |
| 2,318,576 | Arnold | May 11, 1943 |